May 15, 1962    H. GROTE    3,034,625
AXIALLY DISPLACEABLE COUPLING, BRAKE AND LIKE FRICTION MEANS
Filed Jan. 14, 1959
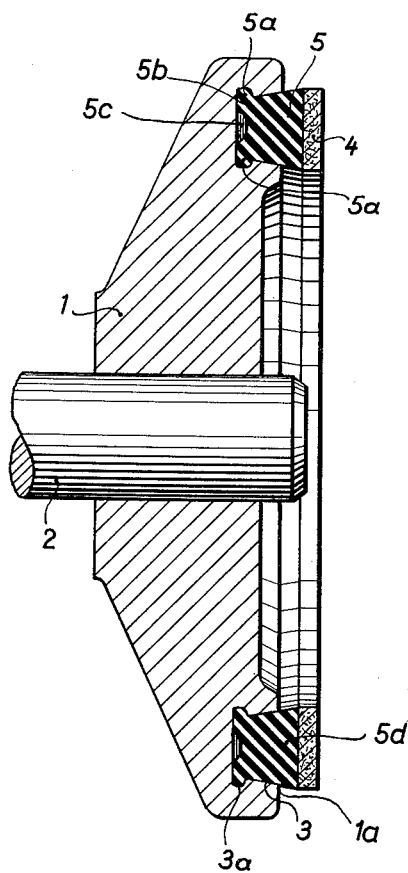
INVENTOR
HUGO GROTE 3,034,625
AXIALLY DISPLACEABLE COUPLING, BRAKE
AND LIKE FRICTION MEANS
Hugo Grote, Wetter (Ruhr), Germany, assignor to Demag-Zug G.m.b.H., Wetter (Ruhr), Germany
Filed Jan. 14, 1959, Ser. No. 786,878
Claims priority, application Germany Jan. 29, 1958
5 Claims. (Cl. 192—107)

This invention refers to axially actuatable friction brake or coupling means.

It has heretofore been known to construct a brake or coupling device of the aforesaid type, in which at least one of the cooperable or coacting parts of such device presents a friction layer or lining, which is supported, for the purpose of dampening stresses effective during breaking in or initiating of the operation of the brake or coupling, on a carrier equipped with an annular buffer or bumper which is either made from rubber or other suitable resilient or yieldable material. Thus it was easily possible to replace worn brake linings on the buffer part of the brake device.

It is also conventional to support or anchor such buffer on a carrier without the employment of adhesives or other usual fastening means, by imparting to the buffer a preload, so that the same was readily connected to the carrier, which may assume the form of a cylindrical joining face, if desired.

In cases of the latter friction type brakes considerable difficulties were, however, encountered to bring about such preload and to safely anchor the buffer component on the carrier. Attempts were made to effectuate such preload or pretension by means of screws which were employed to attach the friction layer or lining to the carrier and to simultaneously impart to the disk-shaped or annular buffer element made of rubber the desirable preload.

Such construction necessitates on the one hand the disposition of a reinforcing ring between the said lining and said buffer in order to eliminate from the brake lining any stretching or elastic forces exerted by said screws, and on the other hand the application of particular manipulations so that the brake lining will only be able to turn or to be displaced relative to the carrier to a small or negligible degree, as it is required in practice and during operation in order to render harmless or neutralize any torsional stresses.

The present invention obviates these and other difficulties and disadvantages inherent in heretofore existing brake or coupling systems of the aforesaid type.

It is, therefore, one of the important objects of the present invention to provide means facilitating easy mounting and anchorage of the friction layer including its buffer support on a carrier without resorting to any fastening means or additional accessories in order to impart to the brake or friction layer a preload, so as to bring about high efficiency of the brake or coupling operation to reduce the manufacturing cost of the friction layer and its support to a minimum, as well as to afford easy replacement of the friction layer and/or buffer after a period of long wear.

It is another object of the present invention to provide means contributing to a highly efficient friction layer and support therefor, whereby the friction layer may have any desirable width, while the support assumes a predetermined shape which permits firm anchorage of the same in a plate-shaped carrier forming part of the coupling or brake.

Still a further object of the present invention is to provide means ensuing firm setting and anchorage of the buffer or support for the friction lining or layer, whereby simultaneously a pretension is conferred on to the latter.

Yet a further object of the present invention is to provide means conducive to easy manipulation and handling of the friction layer relative to the coupling or brake carrier, so that even unskilled labor may be employed for withdrawing from or inserting the friction layer with its support in the carrier or like part of the coupling.

It is still another object of the present invention to provide means rendering the possibility of centering the friction layer with respect to its anchorage in the carrier, so that on the one surface of the buffer the friction layer is exposed, whereas on the opposite face a firm engagement of the buffer in a recess of the carrier may be had, whereby any set screws or any other oscillatory means are not necessitated for holding the assembly of friction layer and buffer in place and under pretension on the carrier.

These and other objects of the invention will become further apparent from the following detailed description, reference being made to the accompanying drawing, showing a preferred embodiment of the invention.

The attached drawing shows by way of example one of many possible embodiments of the invention which shows a cross section through a carrier with the buffer and friction layer as applied to a shaft and to which reference is made in the ensuing specification and claims.

Referring now to the drawing in greater detail, there is disclosed a carrier sheaf or plate 1 which is keyed or otherwise fixed to a motor-driven shaft 2 and is provided at the front face 1a with an annular groove 3 which has a circular undercut portion 3a at the base of said groove. Into this groove 3 is forced a buffer or resilient support 5 made from rubber or any other relatively compact but yieldable material with which is associated the friction producing layer 4 in any appropriate manner, either integral therewith or bonded thereto.

The support 5 of the friction producing means 4 has at its opposite end or base 5b opposed annular lateral extensions or projections 5a. This base 5b has a centrally located arcuate recess 5c whereby the lateral projections 5a may spread into the groove undercut portion 3a.

It will thus be seen that buffer 5 is safely secured against undersirable removal within said circular groove portion 3a, and during rotation of carrier plate 1 the projections 5a will aid in firmly retaining buffer 5 with friction producing layer 4 in position exerting on the latter a predetermined preload so as to afford high efficiency during the operation of the friction layer 4.

From the drawing, it will be further gathered that resilient support means 5 is wedge-shaped in cross section, having its larger surface at the end connected with the friction producing layer or portion 4 and being of reduced width at the base of the groove 3.

Due to the fact that resilient support means or buffer 5, 5a is forcedly fit in groove 3, 3a, a compression or preload is imparted to that support means 5 as well as to the outermost friction producing layer 4. Such preload will become effective at the start of the coupling or brake operation, as it is quite understood.

Due to the provision of the ring-shaped beads or reinforcements 5a, the support 5 and with it the friction layer 4 are positively held in operative position. It is further to be noted that the beads or reinforcements 5a form inner and outer ring-shaped flanges which are separated by the centrally located recess 5c which may be circular or discontinuous if desired. The insertion of the resilient support 5 may be readily had, as the head 5d of the buffer arrangement 5 is greater in width at its outward portion projecting beyond carrier plate 1 than at its base 5b near the projections 5a.

Due to the provision of the arcuate recess 5c, the inner and outer lateral projections 5a will readily give somewhat during the aforesaid insertion, but will then securely hold buffer 5 in place within the groove 3, 3a, without any additional fastening or auxiliary means.

It can thus be seen that there has been provided in accordance with the present invention a carrier having a front face for retaining friction means for use in connection with coupling, brake and like apparatus; comprising an annular buffer element substantially V-shaped in section and provided with a base and with a head forming a friction producing annulus, said head of said buffer element converging toward the base, said base being provided with lateral projections, and circular channel means in the front face of said carrier and for receiving said base of said buffer element and said lateral projections, thereby to firmly retain said buffer element with said head in operative position on said front face of said carrier and for removal therefrom.

Various changes and modifications may be made without departing from the spirit and scope of the present invention and it is intended that such obvious changes and modifications be embraced by the annexed claims.

Having thus described the invention what is claimed as new and desired to be secured by Letters Patent, is:

1. The combination of a rotatable carrier having a front face with an annular groove, the groove being defined by walls with undercut portions, and a rubber buffer element provided at one face thereof with a friction producing layer, said buffer element including an enlarged and expansible base engaging with said undercut portions in said annular groove for retaining in position said buffer element and for simultaneously imparting a preload to said one face and thence to said friction producing layer, said rubber buffer element tapering from said friction producing layer toward said base, said base including opposed laterally projecting means at the end of said base, said laterally projecting means extending into said undercut in assembled condition of said carrier and buffer element.

2. The combination according to claim 1, said friction producing layer being integral with said buffer element and being wider than the base thereof.

3. The combination according to claim 1, said friction producing layer being made of a material different from that of said buffer element.

4. The combination according to claim 1, said base of said buffer element being provided with a central arcuate recess located adjacent said projecting means.

5. The combination of a rotatable carrier having a front face with an annular groove defined in said front face, said groove including annular side walls converging in a direction extending inwardly from said front face, and an annular resilient buffer ring of substantially the same dimension as said annular groove positioned in said groove and having its side walls pretensioned to exert a holding force against the side walls of said carrier, said resilient ring having an outer annular portion made of a friction producing material, said carrier including radially extending undercut portions defined at the interior of said groove and said buffer ring including portions extending into said undercut portions.

References Cited in the file of this patent

UNITED STATES PATENTS

| | | |
|---|---|---|
| 1,216,244 | McDowell | Feb. 13, 1917 |
| 1,423,833 | Craighead | July 25, 1922 |
| 1,731,958 | Wickstrom | Oct. 15, 1929 |
| 2,556,624 | Macbeth | June 12, 1951 |
| 2,593,045 | Maroshick | Apr. 15, 1952 |
| 2,602,603 | Blissit | July 8, 1952 |
| 2,697,900 | Lewis | Dec. 28, 1954 |

FOREIGN PATENTS

| | | |
|---|---|---|
| 212,220 | Great Britain | Apr. 10, 1924 |
| 509,758 | Italy | Jan. 17, 1955 |
| 1,112,658 | France | Nov. 16, 1955 |